United States Patent

Maddox et al.

[19]

[11] Patent Number: 6,065,639

[45] Date of Patent: May 23, 2000

[54] MULTIPLE USE WASH COUNTER AND TIMER

[75] Inventors: Jeffrey T. Maddox, Streetsboro; Michael J. Dolan, Akron, both of Ohio

[73] Assignee: GOJO Industries, Inc., Cuyahoga Falls, Ohio

[21] Appl. No.: 09/258,773

[22] Filed: Feb. 26, 1999

[51] Int. Cl.[7] .................................................. B67D 5/22
[52] U.S. Cl. .............................. 222/36; 222/638; 222/39
[58] Field of Search ................................ 222/638, 23, 39, 222/36, 38, 181.3

[56] References Cited

U.S. PATENT DOCUMENTS

| | | | |
|---|---|---|---|
| 4,621,749 | 11/1986 | Kanfer | 222/153 |
| 4,715,517 | 12/1987 | Potter et al. | 222/181 |
| 4,765,515 | 8/1988 | Lippman | 222/162 |
| 4,836,415 | 6/1989 | Grussmark | 222/638 |
| 5,370,267 | 12/1994 | Schroeder | 222/38 |
| 5,625,659 | 4/1997 | Sears | 377/21 |
| 5,771,925 | 6/1998 | Lewandowski | 222/638 |

*Primary Examiner*—Kevin Shaver
*Assistant Examiner*—Melvin A. Cartagena
*Attorney, Agent, or Firm*—Reese Taylor

[57] ABSTRACT

A fluid dispenser which discharges a predetermined amount of fluid upon actuation of a actuator includes a counter and at least two timers for use by users of the device. The apparatus further includes a switch coupled to the actuator wherein the switch generates a use signal. An operating circuit is carried by the dispenser and provides a processor which receives the use signal and increments or decrements a counter by one. Additionally, the processor generates a flag signal to indicate which of the timers is in use. Each timer has associated therewith a distinct sensor output such as a sound or light to indicate to the user the start of a washing cycle and completion thereof. In the event more than two users are present, the sensor output is not provided. However, a counting event is still recognized. Of course, multiple users of the device or sensor outputs could be provided if desired.

14 Claims, 5 Drawing Sheets

MULTIPLE USE WASH COUNTER AND TIMER

RELATED PATENT APPLICATIONS

None.

FIELD OF THE INVENTION

This invention relates in general to fluid dispensing devices and relates in particular to a device that provides a counting mechanism along with multiple timers to ensure that a person using the dispenser utilizes the dispensed fluid for a predetermined period of time.

BACKGROUND OF THE INVENTION

In the dispensing art, there are a number of known devices for dispensing measured amounts of liquid material. The present invention represents an improvement on liquid dispensers and will be illustrated and described with respect to soap dispensers commonly found in rest rooms and kitchens. However, it will be understood that the principles of the invention may have applicability to the dispensing of other liquids.

There are a number of soap dispensers commercially available, some of which are wall-mounted and include a base, which is adapted to be mounted against a wall or other vertical surface, and a cover. The covers are generally hinged to the mounting base and swing to an open position to permit loading into the dispenser and are closable to a locked position for operation. As such, the soap is often sold in replaceable containers such as collapsible bags with a dispensing tube extending therefrom and having a dispensing nozzle on the projecting end.

Examples of such dispensers can be seen in Potter, U.S. Pat. No. 4,715,517; Lippman, U.S. Pat. No. 4,765,515; and Kanfer, U.S. Pat. No. 4,621,749. These patents disclose dispensers in which a push bar is secured either to the cover or to the base member so that upon engagement and actuation of the push bar by the hand of the user, the dispensing tube containing the soap is collapsed so as to eject a predetermined portion through the dispensing nozzle at the end of the tube onto the hand of the user.

These dispensers are commonly located and used in many different environments. Particularly, they are often used in a hospital or restaurant setting wherein sanitation is of prime importance. To monitor the activity of use of the dispenser, various types of counting mechanisms have been associated with the dispensers. Examples of such dispensers are disclosed in Schroeder, U.S. Pat. No. 5,370,267; and Sears, U.S. Pat. No. 5,625,659. Counting mechanisms are employed as a result of various regulatory bodies determining that, on average, sanitary requirements can be met with a predetermined number of hand washes per employee, during a predetermined period of time, such as an hour, a shift, etc. For example, if two persons are being monitored and the desired number of hand washes averages 10 per hour, the total number of hand washes involving the particular dispenser in an hour would be 20. Another requirement to ensure sanitary conditions is that the persons using the dispenser wash their hands for a predetermined period of time. This requirement ensures that each user of the device thoroughly washes their hands to prevent transmission of germs and infectious diseases.

The difficulty involved in measuring compliance with the requirement of ensuring the number of washes during a predetermined period and ensuring that the user washes his/her hands for a predetermined period of time is not readily obtained with any of the above dispensers. In other words, there is not provided a device which allows for overlapping of simultaneous washing by two individuals wherein each washing event is also counted. Nor is there provided a dispensing device which provides distinct and separate signaling of starting and expiration of the timers so as to alert the users.

Therefore, it has become apparent that it is desirable to be able to measure the number of uses of a washing machine and to provide a timing mechanism for two or more users of the same dispenser.

SUMMARY OF THE INVENTION

It has been found, therefore, that a measuring and timing wash dispensing apparatus can be constructed which can be associated with fluid-dispensing devices of the type generally described above with counter and timing mechanisms for two or more users. For example, in a push-bar type dispenser illustrated herein, a counter recognizes initiation of a use and initiates the start of a timer which is signaled with a sensory output such as a tone or illuminated light. Expiration of the predetermined time results in another tone or turning off of the illuminated light source.

The dispenser is constructed such that a second timing sequence can be initiated during the first timing sequence. Additional use events can take place with use of corresponding timers or, in the alternative, a count can simply be taken without running of a timer when all other timers are in the midst of a timing or use sequence.

Specifically, it has been found that each timer can provide a distinct sensory output. For example, a first timer may have a distinct tone frequency and provide a single tone at the start of a wash cycle and a double tone at the end of the wash cycle. A second timer can be provided which emits a different frequency of a single tone at the start of a wash cycle and a double tone to indicate completion of the wash cycle. Alternatively, a first timer could be provided with a light which is illuminated at the start of a wash cycle and which is turned off at the end of the wash cycle. A second timer could be provided with a different colored light that is illuminated at the start of the second wash cycle and is turned off at the end of the wash cycle.

An additional feature which could be provided is that a counting event will occur even if both timers are running. This avoids confusion between the two current users so that they do not mistakenly think that their washing cycle is complete when a third user starts.

Another feature of the present mechanism is that initiation of the push bar will inhibit a count event. This precludes double counting of one person pushing the bar twice within a predetermined period of time.

The present invention also provides a reset mechanism for resetting the count provided by the dispenser. Another feature of the present device is that it detects the power level of a battery or the like so that the device is disabled upon falling below a minimum power level.

Accordingly, production of an apparatus for measuring the number of counts and initiating timing sequences of the character above described becomes the principle object of this invention with other objects thereof becoming more apparent upon reading of the following brief specification considered and interpreted in view of the accompanying drawings.

BRIEF DESCRIPTION OF THE PREFERRED EMBODIMENTS

Figure 1:
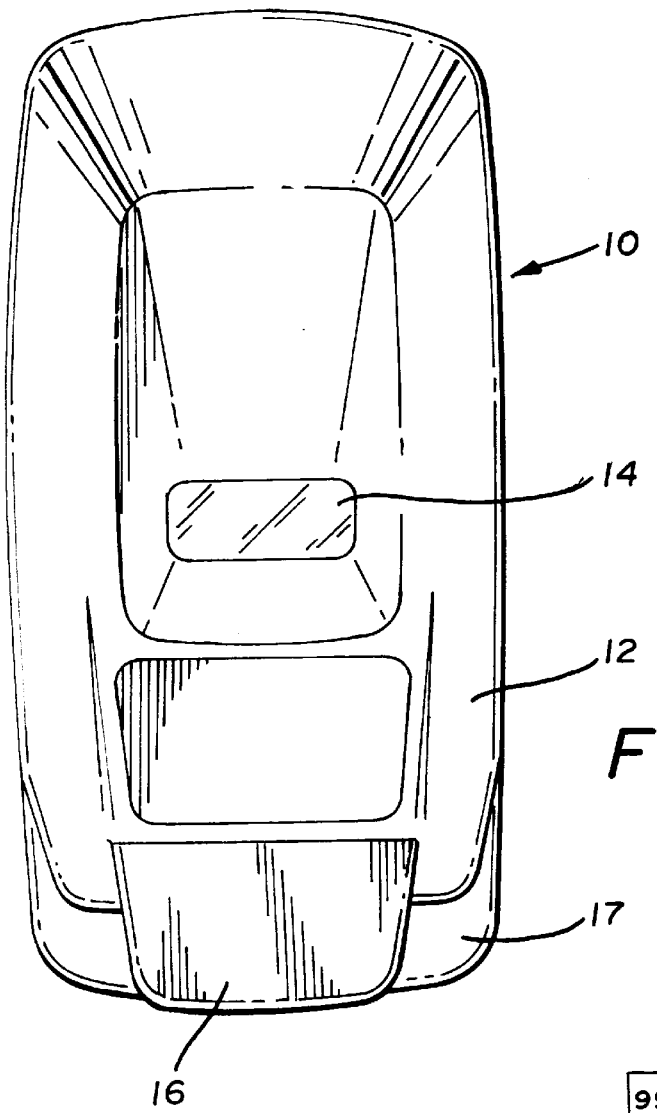
FIG. 1 is a front elevational view of a typical dispenser.

Referring now to FIG. 1 of the drawings, it will be seen that a multiple wash counter and timer dispenser, generally indicated by the numeral 10, includes a housing 12 which is wall mounted. If desired, the housing 12 could be a stand-alone device. Housing 12 carries soap/disinfectant or other type of cleaning fluid that is commonly used in sanitary environments. The housing 12 may be provided with a display window 14 which may show the fluid level of a replaceable fluid container. This allows replacement of the cleaning fluid container when it reaches a low level. The housing 12 is also provided with a bar/actuator 16 wherein a user pushes or pulls the bar in order to discharge a predetermined quantity of fluid. In the drawings, a push-type dispenser is illustrated, but the present invention could be used with a pull-type dispenser as well. In fact, the present invention may be used with virtually any type of dispenser, including, but not limited to, a hands-free dispenser. Thus, while the actuator is referred to herein and illustrated as a bar, any actuator may be employed. The housing 12 may be mounted to a panel 17 if required. It will also be appreciated that the display window 14 may be used for viewing a count display or for viewing of illumination devices associated with a timing mechanism.

Figure 2:
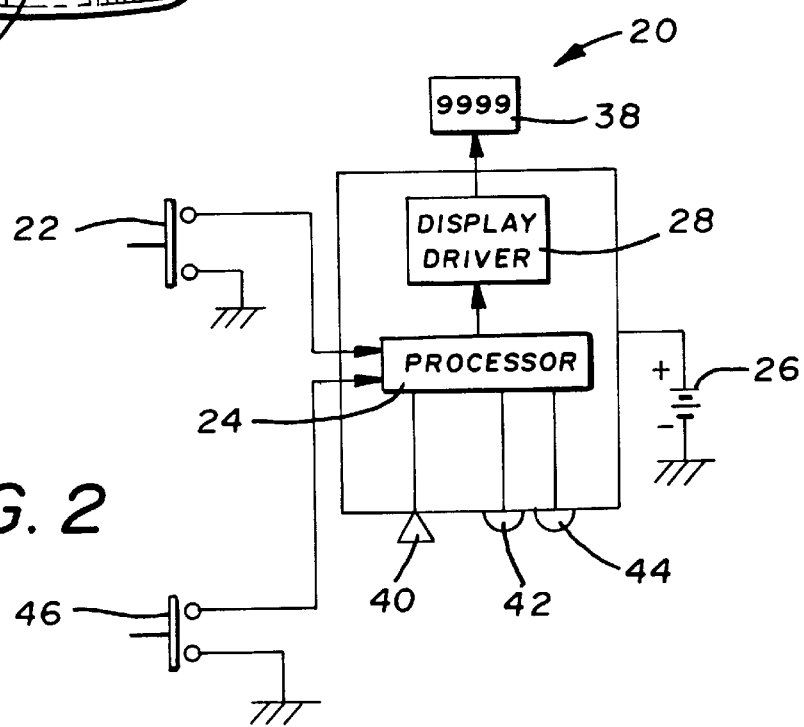
FIG. 2 is a schematic circuit diagram employed in the dispenser.

Referring now to FIG. 2, it can be seen that an operating circuit, generally indicated by the numeral 20, is shown. The operating circuit 20 is carried within the housing 12 in a manner well known in the art. Reference is made to U.S. Pat. No. 5,625,659, which is incorporated herein by reference, where a teaching is provided of how such a circuit may be mounted within a dispenser housing. The operating circuit 20 includes a switch 22 which is coupled to the bar 16, wherein movement of the bar 16, in either a pushing or pulling direction, causes closure of the switch 22. Closure of the switch 22 generates a signal which is received by a processor 24 which contains the necessary memory and operational programming required for operation of the apparatus 10. A power supply 26, such as a dry cell battery, powers components of the operating circuit 20 in a manner well known in the art. Of course, electrical power could be provided by other available voltage sources. A display driver 28 is connected to the processor 24. Upon a recognized closure of the switch 22, the processor 24 generates a signal received by the display driver 28 which in turn provides a signal to a liquid crystal display 38 which provides the indicia indicative of the number of uses of the apparatus 10.

Actuation of the bar 16 and closure of the switch 22 causes the processor 24 to initiate sensory outputs for the benefit of the individuals washing their hands and their supervisors who need to check on the number of uses of the device. The sensory outputs include a tone generator 40 and a first light emitting diode (LED) 42 and a second LED 44. The tone generator 40 is capable of generating different and distinct auditory sounds that are detectable by the human ear. LEDs 42 and 44 are provided at or near the display window 14 for view by the users. It is anticipated the LEDs would be of different colors. However, it is within the scope of the present invention that the LEDs could be the same color or could be indicative of the user number or the like. Likewise, a tone generator 40 in the preferred embodiment generates different frequency tones for the particular user of the device. However, it is within the scope of the present invention that the tone generator could verbalize the user number by announcing "user number 1 start" and "user number 2 finish," etc. Of course, other verbalizations may be employed. A reset switch 46 may be connected to the operating circuit 20. Closure of the reset switch 46 signals the processor 24 to clear the indicia provided on the display 38. This is typically done at the end of the shift or whenever the power supply 26 is re-energized or replaced. Another feature of the processor 24 is that it detects the power level provided by the power supply 26 and in the event the voltage generated by the power supply reaches a reduced level, the counting and timing functions of the processor 24 are disabled.

Figure 3:
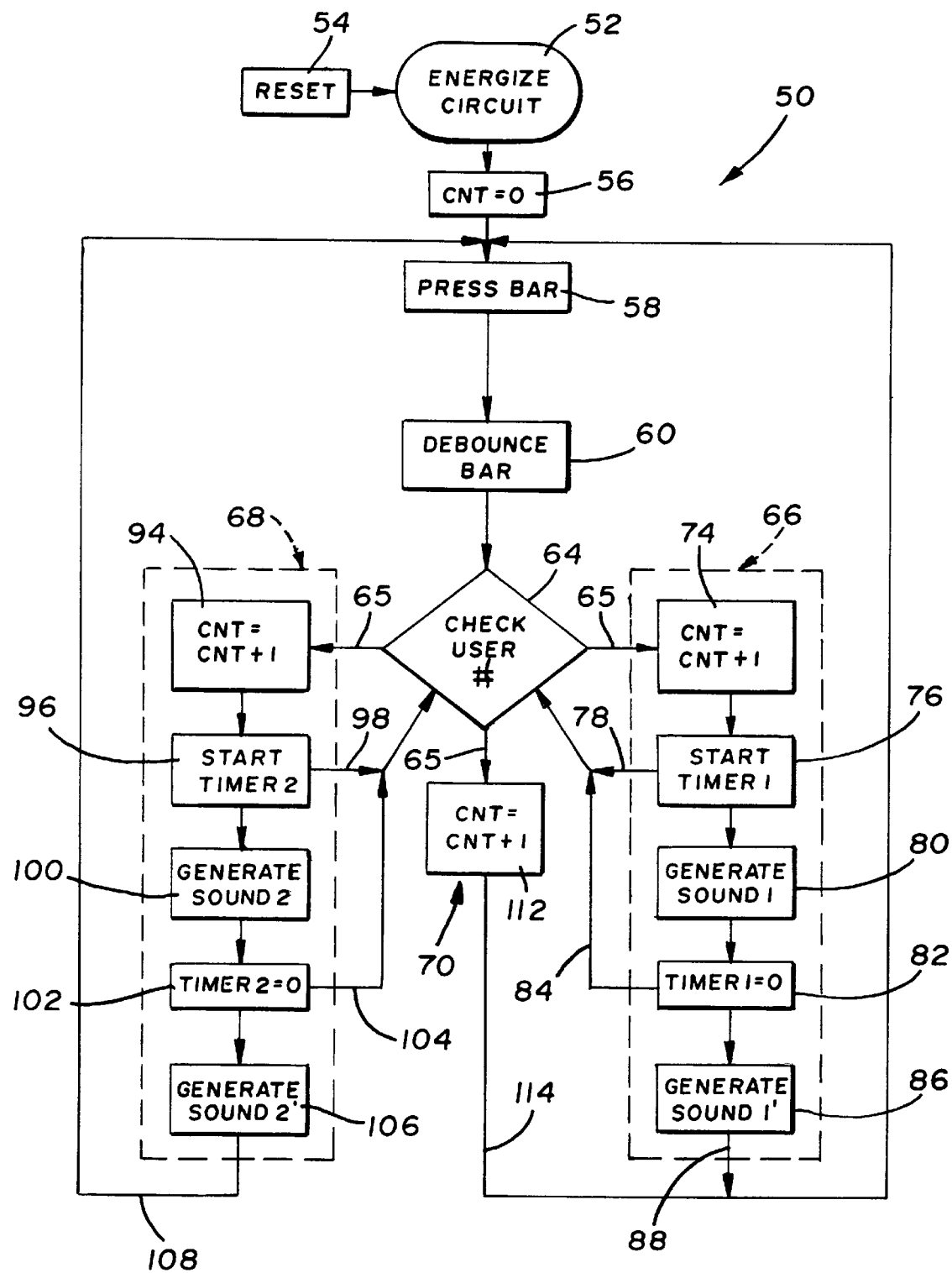
FIG. 3 is a flow chart of the operation of the circuit.

Referring now to FIG. 3, a flow chart, which is generally indicated by the numeral 50, provides an operational sequence of the device 10. At a first step 52, the circuit 20 is energized. At an ancillary step 54, the circuit 20 is reset by either replacement of the battery or closure of the reset button 46. At step 56, a counter within the processor 24 is initialized to a value of 0 and the circuit 20 is ready for operational use. Alternatively, the counter could be initialized to a high number such as 100. In the preferred embodiment, the counter is incremented by one from 0 according to the number of uses; however, the counter could also be decremented from the high number each time the dispenser is used.

At step 58, the user presses the bar 16 for dispensing a fluid from the dispenser. The switch 22 is configured such that the processor 24 checks for an activated or closed condition which is stable for two checks in an approximate 30 millisecond period. If this occurs, a dispensing event is registered and is used as a logical input by the processor 24. Another dispensing event is not recognized until the switch 22 is in the deactivated condition for two checks within an approximate 30 millisecond period. At step 60, the processor 24 performs a "debouncing" function after closure of the switch 22. In other words, the logic input obtained from actuation of the bar 16 is disabled for a time of approximately 2 seconds. As such, any additional closures of the bar 16 in this debounce time period is ignored. As such, all count events are separated by a period greater than the debounce time. Of course, other debounce time periods may be employed.

At step 64, the processor 24 checks and establishes a "user number" to determine the number of users according to closures of the push bar 16 within predetermined time periods. By checking the number of users, the processor 22 generates a flag signal 65 which is routed to a proper operational sequence. As such, the flag signal 65 may be routed to a first branch of instructions generally indicated by the numeral 66, a second branch of instructions generally indicated by the numeral 68, or a third branch of instructions generally indicated by the numeral 70.

Presuming that there have been no users for a period of time and upon actuation of the bar 16 sufficient to register a dispensing event, the check user decision box 64 generates the flag signal 65 and the processor proceeds to the branch 66 or the branch 68, whichever is inactive. The first preference of the processor is to direct the operational sequence to branch 66. Accordingly, at step 74, the counter is incremented by 1. Next, at step 76 a first timer is initiated. Accordingly, the branch 66 provides this information to the check user decision box 64 via a signal 78. The check user box 64 includes a storage device/memory element that is initially set to zero or an inactive setting, but is increased by one when the signal 78 is received. This is referred to as a partially active setting. Upon initiation of the first timer, a first sound is generated at step 80. This sound is a distinct frequency and in the preferred embodiment is approximately a 2 kHz tone generated for approximately half a second. Upon expiration of the timer at step 82, the tone generator 40 at step 86 generates the same frequency tone as at step 80, but in two bursts. In other words, each burst is for a duration of approximately half a second and the bursts are separated by approximately a half second. Upon expiration of the timer at step 82, an expiration signal 84 is sent to the check user number box 64 and the value in the storage device is reduced by one. In the preferred embodiment, the time period between step 76 and step 82 is approximately 22 seconds. Upon completion of step 86, a return signal 88 is generated to await the next actuation of the bar 16.

In the event a second user activates the bar 16 during the first use time period (between steps 76 and 82), the event is recognized at step 58 and the debounce bar step 60 is performed. At step 64, the processor 24 reviews the check user number and ascertains that a first use or timing sequence is currently in process. Accordingly, the flag signal 65 is directed to the branch 68. Accordingly, at step 94, the counter is incremented by 1 and a second timer is started at step 96. Also at step 96, a signal 98 is generated and sent to the check user number box 64. This increments the value of the storage device by one to a fully active setting with a value of two. At step 100, a second sound is generated for the benefit of the second user. This second tone is different from the first tone at approximately 4 kHz and is generated for approximately a half second. When the timer 2 expires at step 102, a double burst signal of the same tone is generated to indicate that the timer is finished. Each of the bursts are for a duration of approximately one-half second and the bursts are separated by approximately one-half second. The timer period between steps 96 and 102 is about 22 seconds. Upon expiration of timer 2 at step 102, an expiration signal 104 is generated and transmitted to the check user number box 64. At this time, the storage value is reduced by one. Upon completion of step 106, a return signal 108 is generated to await the next actuation of the bar 16.

In the event both timers are running simultaneously, as evidenced by a value of two in the storage device, and after the passing of the most recent debounce bar event, the check user box 64 generates a flag signal 65 which is received by the branch 70. When this occurs, the counter is incremented by one and the return signal 114 is generated which awaits the actuation of the next count event. If more than two different tones are used to indicate that two users are present, it is believed that subsequent users would become confused. Accordingly, no tones are generated. However, it is within the scope of the present invention that multiple tones indicative of multiple users could be provided. Branch 70 is only used when both timers are running, that is whenever the storage value is two. In the event branch 68 is active and branch 66 is inactive, and the check user step 64 receives an indication of a new use, the processor 24 proceeds through the branch 66.

The LEDs 44 and 46 may be used in conjunction with or separately from the timing sounds such that the LED 44 lights upon initiation of the branch 66 and extinguishes upon expiration of the first timer. Likewise, the second LED 44 may illuminate during the running of the second timer and extinguishes upon expiration thereof. Of course, additional LEDs or lighting sources could be provided for additional users if desired.

Figure 4:
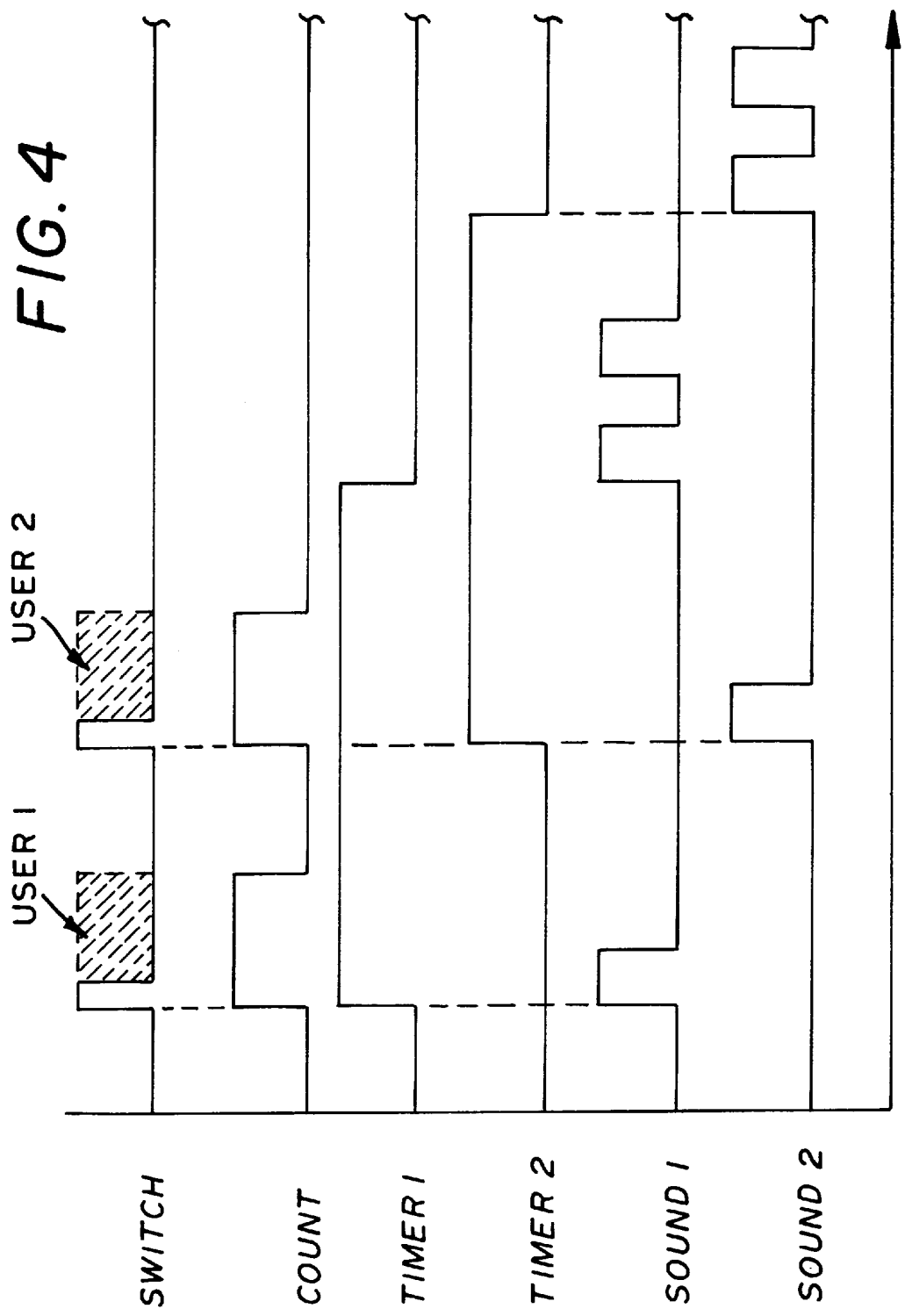
FIG. 4 is exemplary timing sequence of two users actuating the dispenser.

Referring now to FIG. 4, an example of when two users actuate the bar 16 is provided. When a user 1 completes closure of the switch 22, a single count signal is generated which increments the count and starts timer 1. Simultaneously with generation of the count signal, the sound 1 is generated. It will be appreciated that another count event cannot be recognized until the debounce of the switch 22 is complete. The debounce is indicated by the shaded area of the waveform after closure of the switch 22. When a user 2 activates the switch 22, a second count event takes place and timer 2 starts. Upon expiration of the timer 1, sound 1 generates two bursts of like frequency. Next, timer 2 expires and two bursts of the second frequency are generated.

Figure 5:
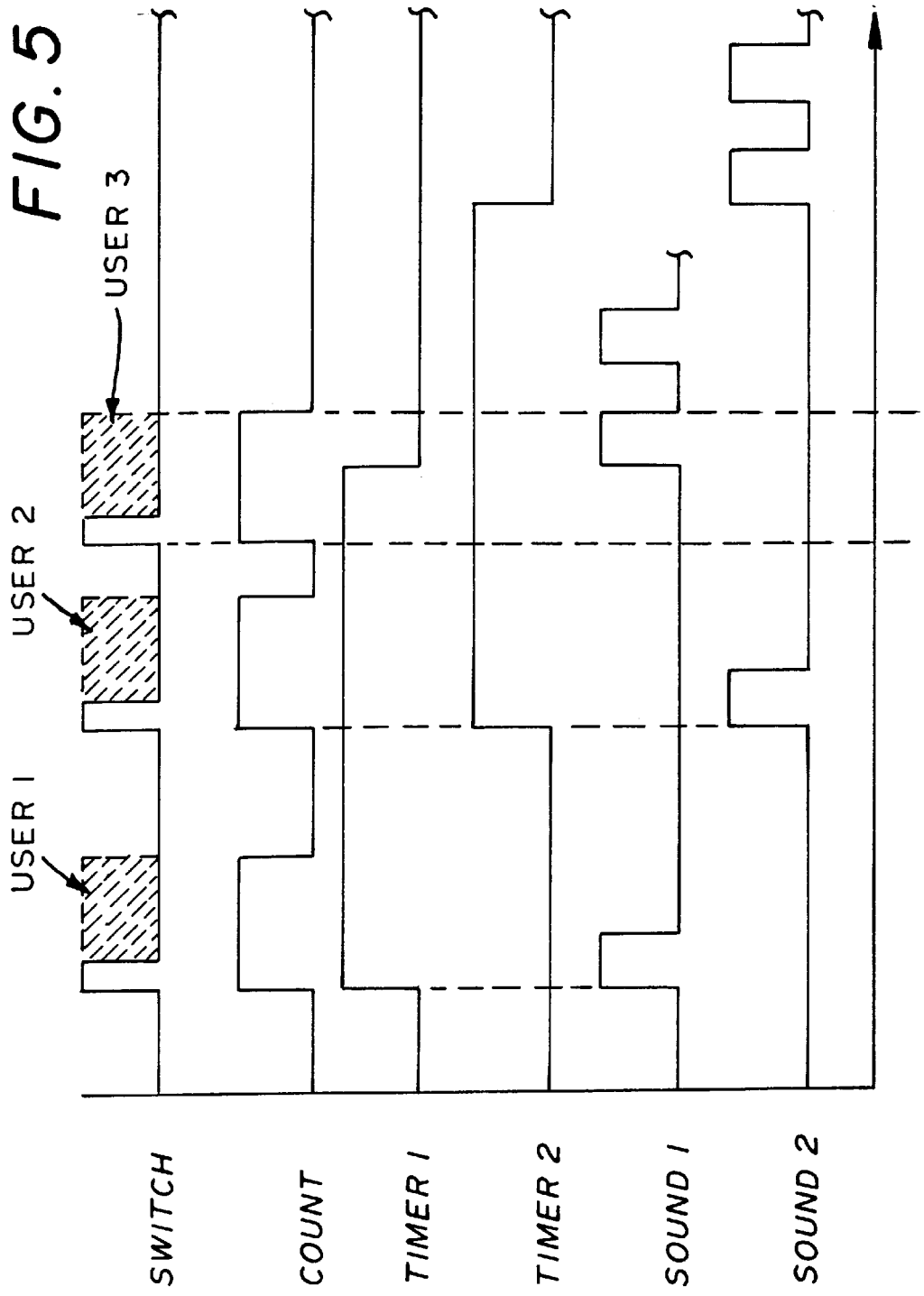
FIG. 5 is exemplary timing sequence of three users actuating the dispenser.

Referring now to FIG. 5, it can be seen that three users may utilize the dispensing device at nearly the same time. As in FIG. 4, two users employ the device and when user 3 actuates the device, a count event takes place. However, since no timers or sound mechanisms are available, no tones are produced.

Figure 6:
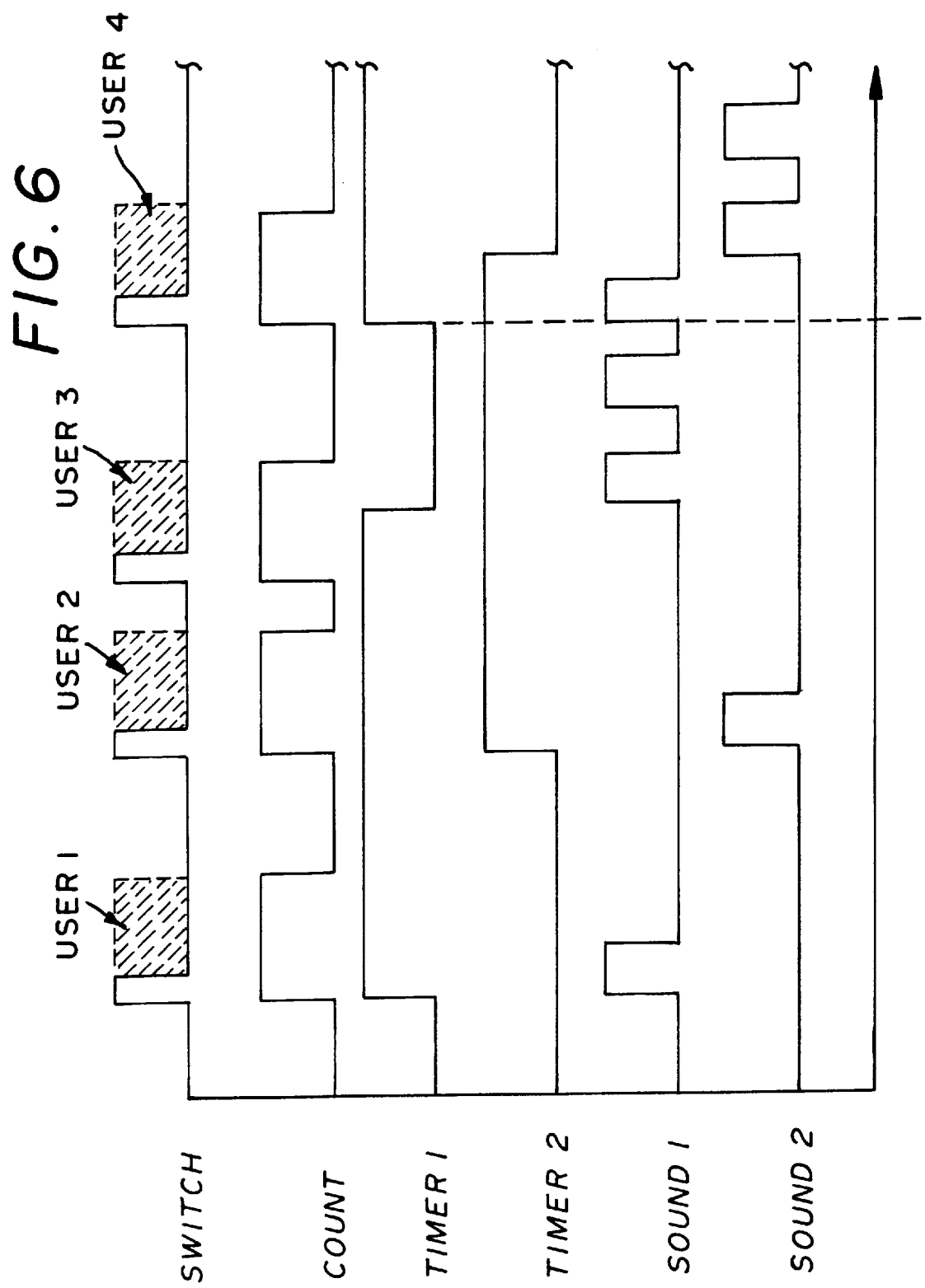
FIG. 6 is exemplary timing sequence of four users actuating the dispenser.

Referring now to FIG. 6, when a fourth user activates the bar 16, it is upon completion of the first user's hand washing period. Accordingly, the timer 1 is available for use and the sound 1, corresponding to timer 1, is generated. Moreover, a counting event takes place even though the second and third users are presumably still washing their hands.

While a full and complete description of the invention has been set forth in accordance with the dictates of the Patent Statutes, it should be understood that modifications can be resorted to without departing from the spirit hereof or the scope of the appended claims. For example, the invention has been described in the context of hand washing and soap dispensers associated therewith. However, it is believed apparent that the measuring and timing function could be readily adapted to dispensers which dispense materials other than soap if so desired.

What is claimed is:

1. Apparatus for measuring the usage of a fluid dispenser which discharges a predetermined amount of fluid upon actuation of an actuator and that provides at least two timers for use by users of the apparatus, comprising:

a) a switch coupled to the actuator, wherein said switch generates a use signal upon actuation of the actuator;

b) a processor for receiving said use signal and incrementing a counter by one, said processor generating a flag signal;

c) at least two timers for receiving said flag signal, each said timer providing a sensory output depending upon said flag signal; and d) said processor adjusting said flag signal depending upon the operational status of said at least two timers.

2. The apparatus according to claim 1, wherein said processor generates an inactive flag signal when all of said timers are in an inactive condition, and an active flag signal when all of said timers are in an active condition.

3. The apparatus according to claim 2, wherein said processor generates a select flag signal when some, but not all, of said timers are in an active condition, said select flag signal received by an inactive timer which in turn generates said sensory output.

4. The apparatus according to claim 1, wherein said sensory output includes a first frequency single tone upon initiation of a first timer and a first frequency double tone upon expiration of said first timer, and wherein said sensory output includes a second frequency single tone upon initiation of a second timer and a second frequency double tone upon expiration of said second timer.

5. The apparatus according to claim 1, wherein said direct sensory output includes illumination of a first light source during running of a first timer and illumination of a second light source during running a second timer.

6. The apparatus according to claim 1, further comprising:
a disenablement feature coupled to said switch for precluding generation of said use signal for a predetermined period of time after actuation of the actuator.

7. The apparatus according to claim 1, wherein said counter is incremented by one upon actuation of the actuator even if said at least two timers are activated.

8. A multiple use wash counter and timer comprising:
a) a housing for carrying a fluid, said housing having an actuator which when actuated dispenses a quantity of the fluid;
b) a power supply;
c) an operating circuit connected to said power supply and coupled to said actuator, said operating circuit having a counter which is incremented upon actuation of said actuator; and
d) at least two timers coupled to said operating circuit, each said timer generating a distinct sensory output upon actuation of said actuator and at expiration of a time sequence.

9. The multiple use wash counter and timer according to claim 8, wherein said operating circuit comprises:

a switch actuated by said actuator and generating a use signal;
a processor for receiving said use signal and generating a flag signal and a count signal, said flag signal employed for actuation of said timers;
and
a display for showing a count representative of said count signal.

10. The multiple use wash counter and timer according to claim 9, wherein said processor further comprises means for adjusting said flag signal depending upon the operational status of said at least two timers.

11. The multiple use wash counter and timer according to claim 10, further comprising:
a tone generator to generate said distinct sensory output according to a value of said flag signal.

12. The multiple use wash counter and timer according to claim 10, further comprising:
a light source associated with each said timer to generate said distinct sensory output according to a value of said flag signal.

13. The multiple use wash counter and timer according to claim 10, further comprising:
a reset button connected to said operating circuit for resetting said counter to a predetermined value.

14. The multiple use wash counter and timer according to claim 10, wherein said processor ignores actuation of said actuator a predetermined period of time after a recognized actuation of said actuator.

* * * * *